US008826813B2

(12) United States Patent
Roden et al.

(10) Patent No.: US 8,826,813 B2
(45) Date of Patent: *Sep. 9, 2014

(54) APPARATUS FOR DISPERSION OF A SECOND PHASE INTO A NON-NEWTONIAN FLUID BASE PRODUCT

(75) Inventors: Allan D. Roden, Noblesville, IN (US); J. Doug Buis, Tipton, IN (US); Randy F. Weaver, Kirkland, IN (US)

(73) Assignee: Carmel Engineering, Kirklin, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,852

(22) Filed: Apr. 7, 2012

(65) Prior Publication Data

US 2012/0199018 A1 Aug. 9, 2012

Related U.S. Application Data

(63) Continuation of application No. 11/740,900, filed on Apr. 26, 2007, now Pat. No. 8,153,178.

(51) Int. Cl.

| | |
|---|---|
| ***A23P 1/10*** | (2006.01) |
| ***B01F 7/04*** | (2006.01) |
| ***B01F 7/00*** | (2006.01) |
| ***B01F 3/04*** | (2006.01) |

(52) U.S. Cl.

CPC ............ *B01F 3/04992* (2013.01); *B01F 7/048* (2013.01); *B01F 2215/0014* (2013.01); *B01F 7/00258* (2013.01); *B01F 3/04588* (2013.01)

USPC ........................................... 99/516; 366/304

(58) Field of Classification Search

USPC ........................................... 99/516; 366/304

See application file for complete search history.

(56) References Cited

U.S. PATENT DOCUMENTS

| | | | | | |
|---|---|---|---|---|---|
| 621,203 | A | * | 3/1899 | Ballbach | 366/281 |
| 1,520,375 | A | * | 12/1924 | Ashley et al. | 366/302 |
| 1,783,864 | A | | 12/1930 | Vogt | |
| 1,783,865 | A | | 12/1930 | Vogt | |
| 1,783,867 | A | | 12/1930 | Vogt | |
| 1,847,149 | A | | 3/1932 | Vogt et al. | |
| 2,063,065 | A | | 12/1936 | Vogt | |
| 2,063,066 | A | | 12/1936 | Vogt | |
| 2,213,056 | A | * | 8/1940 | Skoog et al. | 366/180.1 |
| 2,797,164 | A | | 6/1957 | McGowan et al. | |
| 2,871,128 | A | | 1/1959 | Kuhrt et al. | |
| 2,921,855 | A | | 1/1960 | Melnick et al. | |

(Continued)

FOREIGN PATENT DOCUMENTS

JP 55007007 1/1980

OTHER PUBLICATIONS

Waukesha Cherry-Burrell brochure, "SPX Process Equipment—CR Mixer." Published 2007; 2 pages.

(Continued)

*Primary Examiner* — Anthony Weier

(74) *Attorney, Agent, or Firm* — Faegre Baker Daniels LLP

(57) ABSTRACT

A method and apparatus for producing a non-Newtonian fluid product including a non-Newtonian fluid base product including at least one second phase is shown. A second phase dispersion apparatus is shown which receives the at least one second phase and the non-Newtonian fluid base product and disperses the at least one second phase within the non-Newtonian fluid base product to produce the non-Newtonian fluid product.

18 Claims, 12 Drawing Sheets

(56) References Cited

U.S. PATENT DOCUMENTS

| | | | | | |
|---|---|---|---|---|---|
| 2,937,093 | A | | 5/1960 | Gorman et al. | |
| 2,970,917 | A | | 2/1961 | Melnick | |
| 2,973,269 | A | | 2/1961 | Melnick | |
| 2,977,231 | A | | 3/1961 | Palley et al. | |
| 3,063,815 | A | * | 11/1962 | Redniss | 422/200 |
| 3,150,660 | A | * | 9/1964 | Gontcharuk | 126/343.5 R |
| 3,482,822 | A | * | 12/1969 | Porter et al. | 366/181.4 |
| 3,494,275 | A | | 2/1970 | Bondesson et al. | |
| 3,565,817 | A | | 2/1971 | Lissant | |
| 3,637,402 | A | | 1/1972 | Reid et al. | |
| 3,809,764 | A | | 5/1974 | Gabby et al. | |
| 3,938,783 | A | * | 2/1976 | Porter | 366/98 |
| 4,334,788 | A | * | 6/1982 | Miner | 366/303 |
| 4,388,339 | A | | 6/1983 | Lomneth et al. | |
| 4,439,461 | A | | 3/1984 | Czyzewski et al. | |
| 4,445,429 | A | | 5/1984 | Czyzewski et al. | |
| 4,953,633 | A | * | 9/1990 | Hermans | 165/109.1 |
| 5,202,147 | A | | 4/1993 | Traska et al. | |
| 5,236,696 | A | | 8/1993 | Catiis et al. | |
| 5,906,856 | A | | 5/1999 | Roden et al. | |
| 6,051,271 | A | | 4/2000 | Yamamoto et al. | |
| 6,399,124 | B1 | | 6/2002 | Lesens et al. | |
| 6,432,460 | B1 | | 8/2002 | Zietlow et al. | |
| 6,464,384 | B2 | | 10/2002 | Kubera et al. | |
| 6,793,953 | B2 | | 9/2004 | Zietlow et al. | |
| 7,895,941 | B2 | * | 3/2011 | Roden et al. | 99/453 |
| 8,153,178 | B2 | | 4/2012 | Roden et al. | |
| 2003/0211224 | A1 | | 11/2003 | Eichelberger et al. | |
| 2006/0283196 | A1 | | 12/2006 | Rosenbaum et al. | |
| 2008/0075816 | A1 | | 3/2008 | Jensen et al. | |

OTHER PUBLICATIONS

Waukesha Cherry-Burrell brochure, "CR Mixer." Published 1996; 4 pages.

Ice Cream and Process Solutions. 2003. http://www.icecreamprocesssolutions.com/au/crmixer.html.

* cited by examiner

APPARATUS FOR DISPERSION OF A SECOND PHASE INTO A NON-NEWTONIAN FLUID BASE PRODUCT

RELATED APPLICATIONS

This application is a continuation of U.S. patent application Ser. No. 11/740,900, U.S. Pat. No. 8,153,178, filed Apr. 26, 2007, titled "METHOD FOR DISPERSION OF A SECOND PHASE INTO A NON-NEWTONIAN FLUID BASE PRODUCT", the disclosure of which is expressly incorporated by reference herein.

This application is related to U.S. patent application Ser. No. 11/740,889, now U.S. Pat. No. 7,895,941, filed Apr. 26, 2007, titled "APPARATUS FOR DISPERSION OF A SECOND PHASE INTO A NON-NEWTONIAN FLUID BASE PRODUCT", the disclosure of which is expressly incorporated by reference herein.

BACKGROUND OF THE INVENTION

1. Field of the Invention

The present invention relates to methods and apparatus for incorporating a second phase or miscible ingredient into the production of a non-Newtonian plastic product and in particular to the production of food products, including food products which are generally frozen at room temperature or food products that are generally spreadable at room temperature.

2. Prior Art

Referring to FIG. 1, a prior art system 100 is shown. System 100 is used in the production of a food product, such as margarine. In FIG. 1, a food product base source 102 provides a food product base to a scraped surface heat exchanger 104 or A-unit through a positive displacement pump 106. The food product base is mixed together with a gas provided by a gas source 108 at the scraped surface heat exchanger 104. Coolant 110, such as ammonia, is circulated through scraped surface heat exchanger 104 thereby chilling the mixture of the food product base and the gas.

From the scraped surface heat exchanger, if a softer product is desired the chilled mixture of the food product and the gas is provided to one of a whipper (not shown) and a B-unit 112. The B-unit provides crystallization time allowing fat crystals to form under gentle mixing. The amount of mixing varies the product produced. Too much mixing with the B-unit makes the product too soft and too little mixing results in the product being too brittle. From the B-unit 112, the chilled mixture of the food product base and the gas is provided to a filler apparatus 114 which forms the mixture for packaging and/or packages the mixture. As shown in FIG. 1, the gas is added prior to the food product exiting the scraped surface heat exchanger 104.

A recycle circuit 116 is provided to take the product exiting unit 112 back to the food product base source 102. The chilled mixture of the food product base and the gas is reheated by heating device 118 prior to be returned to food product base source 102. The recycle circuit 116 is used for occasions when there are interruptions to the requirements of filler 114 or to achieve a steady state wherein the gas is more uniformly dispersed in the chilled mixture of the food product base. For example, for a high production rate filling operation, there is at least a five minute recycle period at the beginning of a thirty minute run to obtain a more uniformly dispersed gas in the chilled mixture of the food product base and a five minute recycle time at the end of the thirty minute run. As such, only twenty minutes of productive filling time is available. This is due to the high volume of material in the equipment and the time required to flush the equipment clean. In addition the metering of the gas phase often is an iterative process requiring several adjustments each requiring at least a 5 minute flush out time. This can lead to very long start-up cycles.

By recycling the chilled mixture of the food product base and the gas, it is difficult to control the proportion of gas in the subsequent chilled mixture of the food product base and the gas. The addition of the additional gas also reduces the ability of the scraped surface heat exchanger to transfer heat.

Further, in certain cases another component is added prior to the location of gas source 108, such as fish oil to margarine. The fish oil may become degraded by reheating through recycle circuit 116 or it could be damaged in addition process prior to chiller.

A need exists for a better system and method for incorporating a second phase into a non-Newtonian fluid product base.

SUMMARY OF THE INVENTION

In an exemplary embodiment of the present disclosure, a system is provided to incorporate a second phase into a non-Newtonian fluid product base to produce a non-Newtonian fluid product having a dispersed second phase therein. An exemplary second phase is a gas and an exemplary non-Newtonian fluid product base is a chilled food product base. Exemplary gases include nitrogen, other types of inert gases, and other suitable gases. Other exemplary second phases include colorants, additives, oils, and other products. Exemplary additives include liquids or syrups. Exemplary liquids include fish oil and other suitable liquids. Exemplary syrups include caramel and other suitable syrups, solids, such as malt, sugar, cinnamon, or other suitable solids. In the case of solids, the non-Newtonian fluid product including a dispersed second phase therein is a solid liquid dispersion.

In an exemplary embodiment of the present disclosure, a method of producing a non-Newtonian fluid product containing a non-Newtonian fluid base product and a second phase is provided. The method including the steps of: receiving a non-Newtonian fluid base product; receiving a second phase; and dispersing generally uniformly the second phase throughout the non-Newtonian fluid base product to produce the non-Newtonian fluid product. The step of dispersing generally uniformly the second phase throughout the non-Newtonian fluid base product to produce the non-Newtonian fluid product including the step of passing the non-Newtonian fluid base product and the second phase through an apparatus including a plurality of mixing zones and a plurality of high shear zones, wherein the high shear zones break up the non-Newtonian fluid base product.

In another exemplary embodiment of the present disclosure, a method of producing a food product is provided. The method including the steps of: receiving a food product base; chilling the food product base to produce a chilled food product base, the chilled food product base being a non-Newtonian fluid; adding a second phase to the chilled food product base; and mixing the chilled food product base and the gas to produce the food product.

In still another exemplary embodiment of the present disclosure, a method of producing a non-Newtonian fluid product containing a non-Newtonian fluid base product and a second phase is provided. The method including the steps of: providing a closed loop system wherein a non-Newtonian fluid base product is produced from a base product provided from a base product source. The closed loop system including a recycle circuit whereby the non-Newtonian fluid base product produced is returned to the base product source and an outlet through which the non-Newtonian fluid base product produced may exit the closed loop system. The method further including the steps of providing a filler apparatus which is in fluid communication with outlet of the closed loop system, the filler apparatus to present the non-Newtonian fluid product for packaging; coupling the filler apparatus to the outlet of the closed loop system through a second phase dispersion apparatus; introducing a second phase into the non-Newtonian fluid base product after the non-Newtonian fluid base product leaves the closed loop system; and dispersing the second phase throughout the non-Newtonian fluid base product in the second phase dispersion apparatus to produce the non-Newtonian fluid product.

In yet still a further exemplary embodiment of the present disclosure, a second phase dispersion apparatus for dispersing a second phase within a non-Newtonian fluid base product to produce a non-Newtonian fluid product is provided. The second phase dispersion apparatus including a housing having a body, at least one inlet through which the non-Newtonian fluid base product and the second phase are introduced, a cavity in the body wherein the non-Newtonian fluid base product and the second phase are mixed to generally evenly disperse the second phase in the non-Newtonian fluid base product, and an outlet through which the non-Newtonian fluid product is passed. The apparatus further including a first plurality of pins protruding into the cavity, the first plurality of pins being fixed relative to the body and arranged in a plurality of rows; a rotatable shaft positioned within the cavity, the rotatable shaft being rotatable relative to the body of the housing; and a second plurality of pins supported by the rotatable shaft and arranged to interleave between the first plurality of pins as the rotatable shaft is rotated relative to the housing. A longitudinal spacing between the first plurality of pins and adjacent ones of the second plurality of pins being a first distance and a diameter of the first plurality of pins and a diameter of the second plurality of pins being a second distance, the second distance being about twice the first distance.

In yet another exemplary embodiment, for larger diameter rotary pins, such as about 0.5 inches in diameter, are used the clearance between the rotating pin in each stationary is at most 120 thousands of inch and minimum of 20 thousands.

In a further exemplary embodiment of the present disclosure, an apparatus for converting a base product from a base product source and a second phase from a second phase source into a non-Newtonian fluid product including a non-Newtonian fluid base product and the second phase is provided. The apparatus including a positive pump receiving the base product; at least one heat exchanger operatively coupled to the positive pump to receive the base product, the at least one heat exchanger producing a non-Newtonian fluid base product; and a second phase dispersion apparatus operatively coupled to the at least one heat exchanger to receive the non-Newtonian fluid base product and operatively coupled to the second phase source to receive the second phase. The second phase dispersion apparatus including a plurality of shear members which disperse the second phase within the non-Newtonian fluid base product producing the non-Newtonian fluid product.

In yet still a further exemplary embodiment of the present disclosure, an apparatus for converting a food product base and a second phase from a second phase source into a food product is provided. The apparatus including a positive pump receiving the food product base; a chiller operatively coupled to the positive pump to receive the food product base, the chiller producing a chilled food product base; and a second phase dispersion apparatus operatively coupled to the chiller to receive the chilled food product base and operatively coupled to the second phase source to receive the second phase. The second phase dispersion apparatus including a plurality of shear members which disperse the second phase within the chilled food product base producing the food product.

In yet still another exemplary embodiment of the present disclosure an apparatus for converting a base product from a base product source and a second phase from a second phase source into a non-Newtonian fluid product including a non-Newtonian fluid base product and the second phase is provided. The apparatus including a closed loop system wherein the non-Newtonian fluid base product is produced from the base product provided from the base product source. The closed loop system including a recycle circuit whereby the non-Newtonian fluid base product produced is returned to the base product source. The closed loop system having an outlet through which the non-Newtonian fluid base product produced may exit the closed loop system. The apparatus further including a filler apparatus in fluid communication with outlet of the closed loop system, the filler apparatus to present the non-Newtonian fluid product for packaging, and a second phase dispersion apparatus in fluid communication with the outlet of the closed loop system to receive the non-Newtonian fluid base product produced, in fluid communication with the second phase source to receive the second phase, and in fluid communication with the filler apparatus to provide the non-Newtonian fluid product to the filler apparatus. The second phase dispersion apparatus disperses the second phase throughout the non-Newtonian fluid base product to produce the non-Newtonian fluid product.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to the precise forms disclosed. Rather, the embodiments selected for description have been chosen to enable one skilled in the art to practice the invention. The disclosure is applicable to the production of any non-Newtonian fluid product including a non-Newtonian fluid product base and a second phase, one example of which is the production of a food product from a chilled food product base and a second phase which includes a gas. Another example is the production of a food product from a chilled food product base and a second phase which includes an oil, such as fish oil. Yet another example is the production of a food product from a chilled food product base and a second phase which includes a colorant. Still another example is the production of a food product from a chilled food product base and a second phase which includes a solid. Still yet another example is the production of a polymeric product from a polymeric base and a second phase which includes a liquid, such as water.

Figure 1:
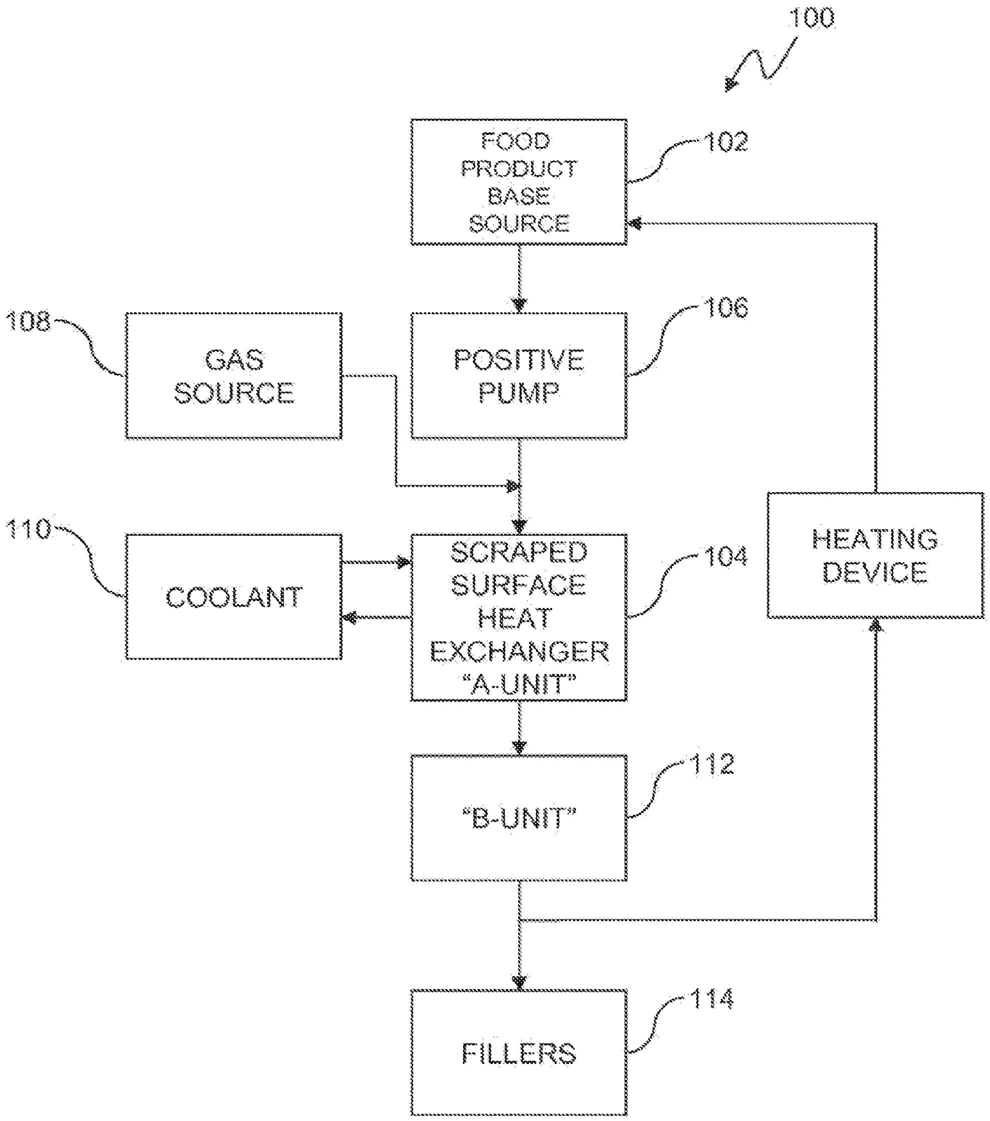
FIG. 1 PRIOR ART
FIG. 1 is a prior art system for producing a food product from a food product base and a gas.
Figure 2:
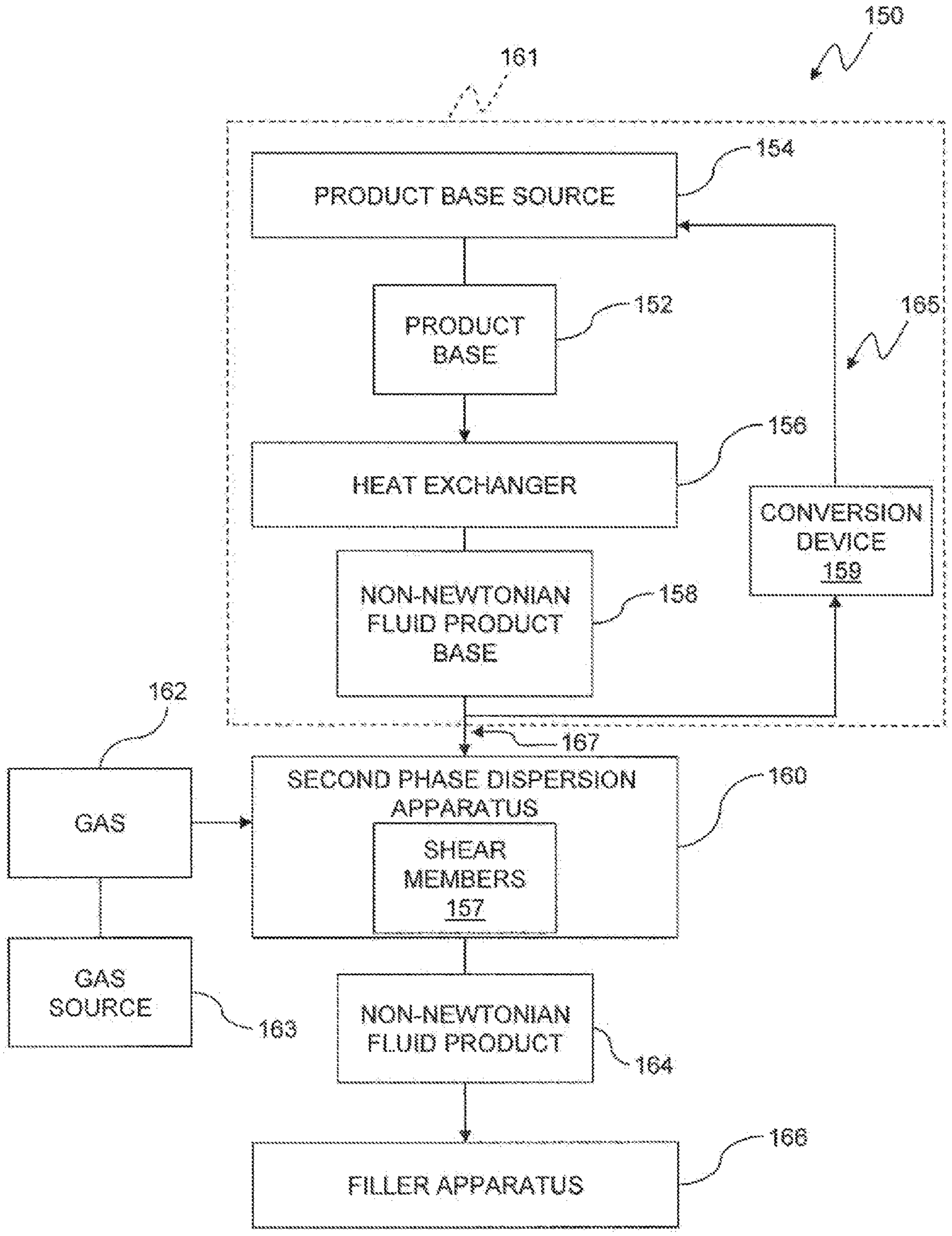
FIG. 2 is a representative view of a system for producing a non-Newtonian fluid product from a non-Newtonian fluid product base and a second phase.

Referring to FIG. 2, a system 150 for producing a non-Newtonian fluid product including a non-Newtonian fluid product base 158 and a second phase 162 is shown. System 150 includes a closed loop system 161 wherein a non-Newtonian fluid product base 158 is produced from product base 152. non-Newtonian fluid product base 158 is provided at an outlet 167 of closed loop system 161. In one embodiment, outlet 167 of closed loop system 161 corresponds to a fluid conduit in fluid communication with an outlet of a heat exchanger 156.

Product base 152 is provided by a product source 154. Product base 152 includes one or more components that are to be included in the final non-Newtonian fluid product 164. In one embodiment, product base 152 should include all of the components that need to be incorporated prior to passing the product base 152 through a heat exchanger 156. The product base is either heated as it passes through heat exchanger 156 or is chilled as it passes through heat exchanger 156. In either case a non-Newtonian fluid product base 158 is produced. It should be appreciated that additional components may be interposed prior to heat exchanger 156 or subsequent to heat exchanger 156, such as a B-unit or a whipper apparatus.

Prior to outlet 167, a recycle circuit 165 is provided as apart of closed loop system 161. Recycle circuit 165 receives excess non-Newtonian fluid product base 158 that is not passed through outlet 167 or all of the non-Newtonian fluid product base 158 in the case wherein no non-Newtonian fluid product base 158 is exiting through outlet 167. In one embodiment, non-Newtonian fluid product base 158 does not exit through outlet 167 when subsequent components of system 150 are being attended to for maintenance or other reasons.

Recycle circuit 165 includes a conversion device 159 that converts non-Newtonian fluid product base 158 back into base product 152 which is provided back to an input side of heat exchanger 156. In the case wherein heat exchanger 156 has chilled base product 152 to produce non-Newtonian fluid product base 158, conversion device 159 includes a heating device for heating non-Newtonian fluid product base 158 up.

In an exemplary embodiment, product base 152 is for margarine and includes edible oil, milk salt, flavorings, colorants, and emulsifiers. Product base 152 for margarine is generally in liquid form prior to entering heat exchanger 156. In another exemplary embodiment, product base 152 is for peanut butter and includes ground peanuts, salt, and emulsifiers or oil fixative. Product base 152 for peanut butter is generally in liquid form prior to entering heat exchanger 156. In a further exemplary embodiment, product base 152 is for pudding and includes water, flavorings, sugar starch, gums oil emulsifiers and other minor ingredients. product base 152 for pudding is generally in liquid form prior to entering heat exchanger 156. In still a further exemplary embodiment, product base 152 is for ice cream and includes milk butter fat, sugar, emulsifiers, crystal modifiers, and flavorings. Product base 152 for ice cream is generally in liquid form prior to entering heat exchanger 156. Other suitable food product bases may utilize system 150. In still yet a further exemplary embodiment, product base 152 is a polymeric material for earplugs or other suitable products and includes polyurethane, carbon dioxide, and colorant. Product base 152 for earplugs is generally in liquid form prior to entering heat exchanger 156.

In one embodiment, heat exchanger 156 is a scraped surface heat exchanger. An exemplary scraped surface heat exchanger is VOTATOR brand scraped surface heat exchanger available from Waukesha Cherry-Burrell located at 611 Sugar Creek Road, Delavan, Wis. 53115. Another exemplary scraped surface heat exchanger is available from Carmel Engineering located at 17650 Springmill Road, Westfield, Ind. 46074. Additional details regarding exemplary scraped surface heat exchangers are disclosed in U.S. Pat. No. 1,783,864; U.S. Pat. No. 1,783,865; U.S. Pat. No. 1,783,867; U.S. Pat. No. 2,063,065; and U.S. Pat. No. 2,063,066, the disclosures of which are expressly incorporated by reference herein. It should be understood that heat exchanger 156 may include multiple machines, such as multiple scraped surface heat exchangers.

Upon exiting heat exchanger 156, product base 152 has become a non-Newtonian fluid product base 158. A second phase 162 from a second phase source 163 is introduced into the non-Newtonian fluid product base 158 and the gross dispersion enters the second phase dispersion apparatus 160. In one embodiment, second phase 162 is a gas and second phase source 163 is a pressurized source of gas, such as a cylinder. Second phase 162 is provided from second phase source 163 through a valve at a given flow rate. Exemplary gases include nitrogen, other inert gases, and other suitable gases. The dispersion of second phase 162 in non-Newtonian fluid product base 158 reduces the density of the non-Newtonian fluid product base 158. This may have several beneficial effects depending upon the given food product being produced. For example, the dispersion of second phase 162 increases the spreadability of food products, such as margarine and peanut butter, and increases the volume of the product. In another example, the flavor of the food product is enhanced. second phase 162 carries flavor released from non-Newtonian fluid product base 158 to the nose of the person consuming the food product.

By introducing second phase 162 outside of closed loop 161, second phase 162 is not introduced into recycle circuit 165. As such, the amount of second phase 162 contained in non-Newtonian fluid product 164 is accurately maintained. Further, the second phase 162 is not subject to degradation by passing through one or both of heat exchanger 156 and conversion device 159. In addition, start-up and shut-down times may be reduced for changes in the second phase, such as the changing of a colorant from one run to the next run or adjusting the quantity of the second phase.

In one embodiment, non-Newtonian fluid product base 158 does not have any gas that has been purposefully introduced therein prior to second phase 162. In one embodiment, non-Newtonian fluid product base 158 includes some gas that has been purposefully introduced therein prior to second phase 162. In one example, a majority of the purposefully introduced gas is introduced as second phase 162.

In one embodiment, second phase 162 comprises up to about 40% percent by volume of non-Newtonian fluid product 164. In one embodiment, second phase 162 comprises up to about 50% percent by volume of non-Newtonian fluid product 164. In one embodiment, second phase 162 comprises at least about 15% percent by volume of non-Newtonian fluid product 164. In one embodiment, second phase 162 comprises from about 15% percent by volume of non-Newtonian fluid product 164 to about 50% percent by volume of non-Newtonian fluid product 164.

Second phase dispersion apparatus 160 operates to disperse second phase 162 throughout non-Newtonian fluid product base 158. In one embodiment, second phase dispersion apparatus 160 operates to generally evenly disperse second phase 162 throughout non-Newtonian fluid product base 158. In one embodiment, second phase dispersion apparatus 160 disperses second phase 162 throughout non-Newtonian fluid product base 158 through the operation of a plurality of shear members 157.

Exemplary second phase 162 components include one or more of a fluid and a solid. Exemplary gaseous fluids include nitrogen, other types of inert gases, and other suitable gases. Other exemplary second phases include colorants, additives, oils, and other products. Exemplary additives include liquids or syrups. Exemplary liquids include fish oil and other suitable liquids. Exemplary syrups include caramel and other suitable syrups. Exemplary solids include malt, sugar, cinnamon, or other suitable solids.

Non-Newtonian fluid product 164 is passed onto filler apparatus 166. Filler apparatus 166 prepare non-Newtonian fluid product 164 for packaging and/or package non-Newtonian fluid product 164. In the case of margarine, filler apparatus 166 may include one or more rotary or piston type fillers. In the case of peanut butter, filler apparatus 166 may include one or more rotary or piston type fillers.

Figure 2A:
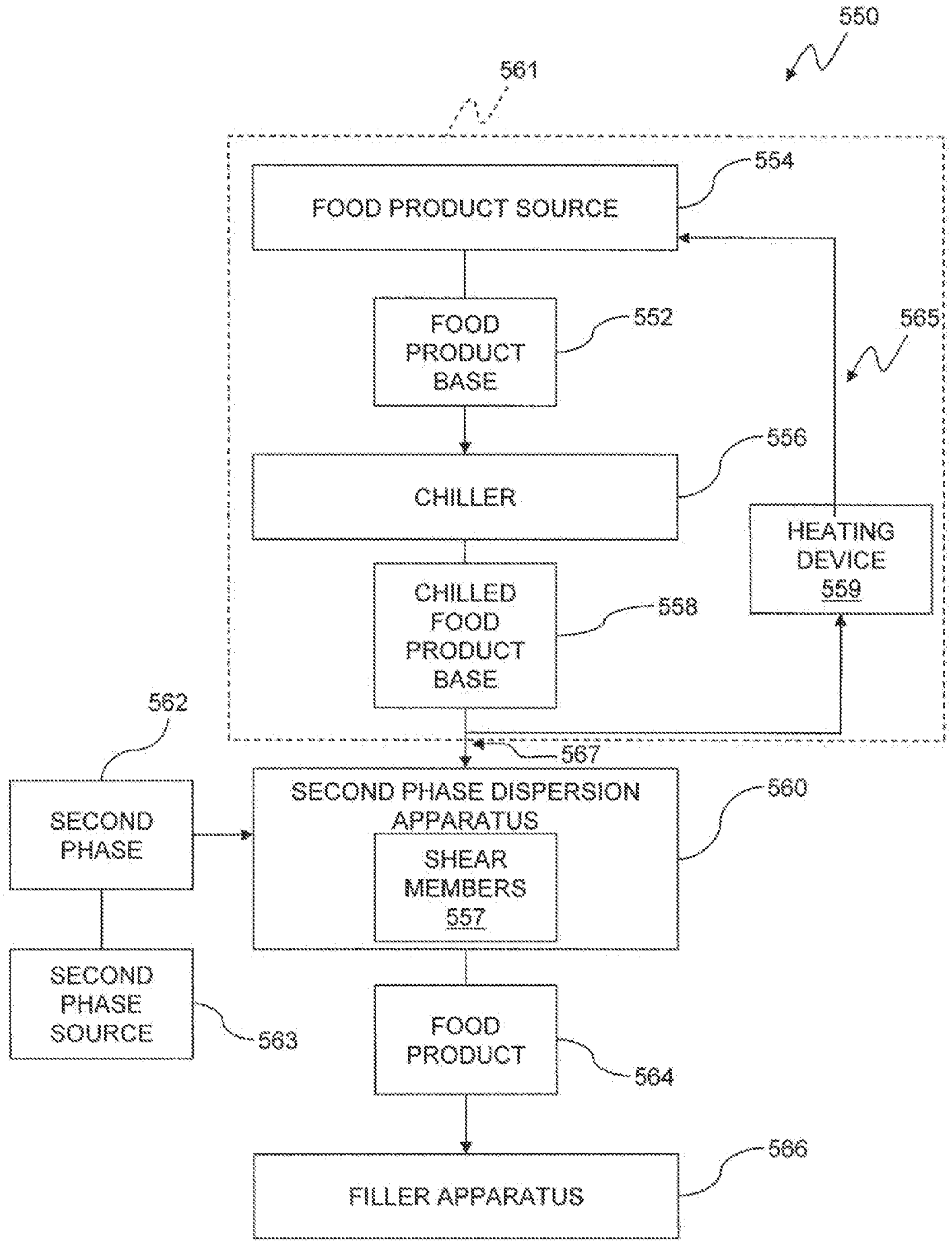
FIG. 2A is a representative view of a system for producing a food product from a chilled food product base and a second phase.

Referring to FIG. 2A, an embodiment of system 150, system 550 for producing a food product 564 including a chilled food product base 558 and a second phase 562, is shown. Food product base 552 is provided by a food product source 554. Food product base 552 includes one or more components that are to be included in the final food product. A chiller 556 is provided as heat exchanger 156. An exemplary chiller is a scraped surface heat exchanger.

Chiller 556 reduces the temperature of food product base 552 forming a chilled food product base 558. In one embodiment, chiller 556 receives a liquid or semi-liquid food product base 552 and increases the stiffness of the food product base 552 by chilling it. The increase in stiffness may be due to causing the formation of crystals in the food product base 552 or otherwise solidifying the food product base 552. In one embodiment, chilled food product base 558 results from food product base being chilled down to a temperature of about 25 to about 90° F.

Upon exiting chiller 556, food product base 552 has become a chilled food product base 558. Chilled food product base is then introduced to a second phase dispersion apparatus 560 along with second phase 562 from a second phase source 563. In one embodiment, second phase 562 is a gas and second phase source 563 is a pressurized source of gas, such as a cylinder. Second phase 562 is provided from second phase source 563 through a valve at a given flow rate. Exemplary gases include nitrogen, other inert gases, and other suitable gases. The dispersion of second phase 562 in chilled food product base 558 reduces the density of the chilled food product base 558. This may have several beneficial effects depending upon the given food product being produced. For example, the dispersion of second phase 562 increases the spreadability of food products, such as margarine and peanut butter. In another example, the flavor of the food product is enhanced. Second phase 562 carries flavor released from chilled food product base 558 to the nose of the person consuming the food product.

System 550, like system 150, includes a closed loop system 561 having a recycle circuit 565 wherein the chilled food product base 558 is heated as it passes through a heating device 559. Second phase 562 is introduced outside of closed loop system 561.

In one embodiment, chilled food product base 558 does not have any gas that has been purposefully introduced therein prior to second phase 562. In one embodiment, chilled food product base 558 includes some gas that has been purposefully introduced therein prior to second phase 562. In one example, a majority of the purposefully introduced gas is introduced as second phase 562.

In one embodiment, second phase 562 comprises up to about 40% percent by volume of food product 564. In one embodiment, second phase 562 comprises up to about 50% percent by volume of food product 564. In one embodiment, second phase 562 comprises at least about 15% percent by volume of food product 564. In one embodiment, second phase 562 comprises from about 15% percent by volume of food product 564 to about 50% percent by volume of food product 564.

Second phase dispersion apparatus 560 operates to disperse second phase 562 throughout chilled food product base 558. In one embodiment, second phase dispersion apparatus 560 operates to generally evenly disperse second phase 562 throughout chilled food product base 558. In one embodiment, second phase dispersion apparatus 560 disperses second phase 562 throughout chilled food product base 558 through the operation of a plurality of shear members 557.

In one embodiment, second phase 162 includes fish oil and non-Newtonian fluid product base 158 is a margarine base. In one example, the second phase 162 further includes a gas.

Food product 564 is passed onto filler apparatus 566. Filler apparatus 566 prepare food product 564 for packaging and/or package food product 564. In the case of margarine, filler apparatus 566 may include one or more rotary or piston type fillers. In the case of peanut butter, filler apparatus 566 may include one or more rotary or piston type fillers.

Figure 3:
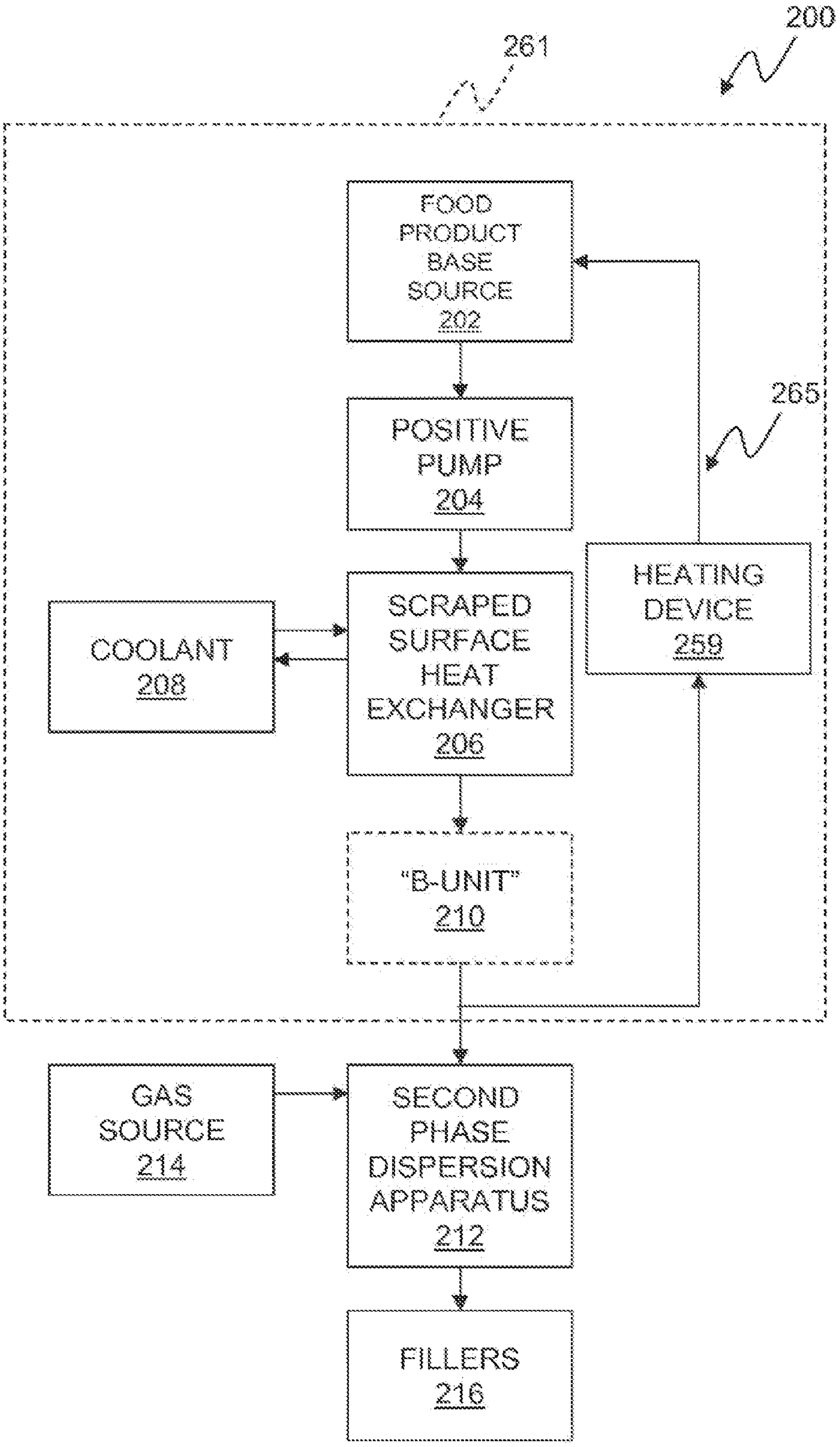
FIG. 3 is a representative view of one implementation of the system of FIG. 2.

Referring to FIG. 3, a system 200 is shown which is an exemplary implementation of system 150. A food product base source 202 provides a food product base which is fed through a positive pressure pump 204 into a scraped surface heat exchanger 206. As is known, scraped surface heat exchanger 206 has an internal passageway through which the food product is passed and a second passageway through which coolant 208 is passed. Coolant 208 operates to remove heat from the food product to increase the stiffness of the food product. An exemplary coolant is liquid ammonia.

A chilled food product base exits scraped surface heat exchanger 206 and is presented to a second phase dispersion apparatus 212. Second phase dispersion apparatus 212 is the same as second phase dispersion apparatus 160. The chilled food product base may optionally be passed through one or more various apparatus to soften or otherwise work the chilled food base product. An exemplary apparatus is shown in FIG. 3 as a B-unit 210. The B-unit allows crystallization to proceed under controlled conditions. An exemplary apparatus is shown in FIG. 4 as a whipper 220 or a phase invertor which allows reversion of emulsions.

The chilled food product base and a gas from a gas source 214 are mixed together in second phase dispersion apparatus 212 in the same manner as explained above in connection with second phase dispersion apparatus 160.

Figure 4:
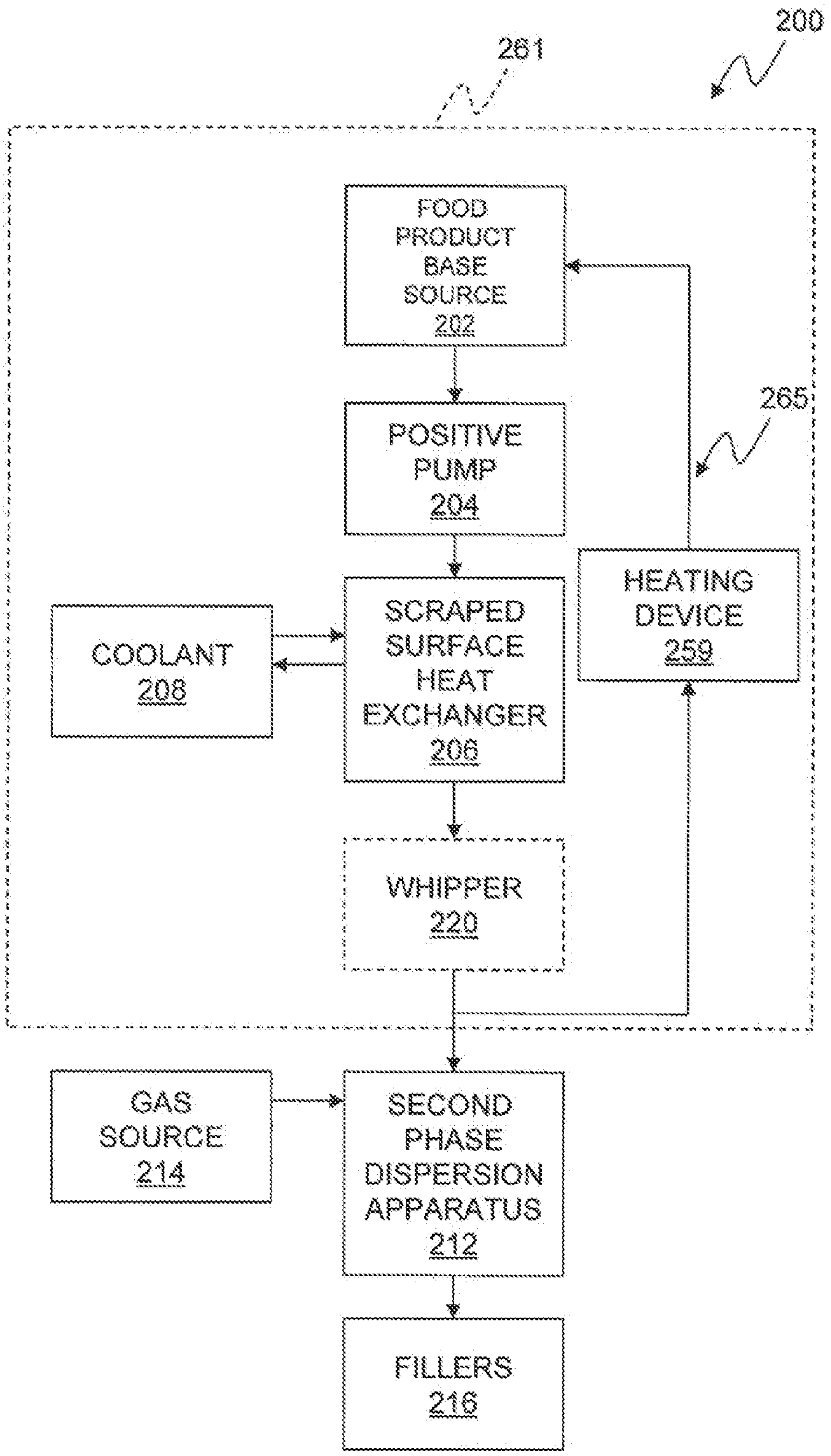
FIG. 4 is a representative view of another implementation of the system of FIG. 2.
Figure 5:
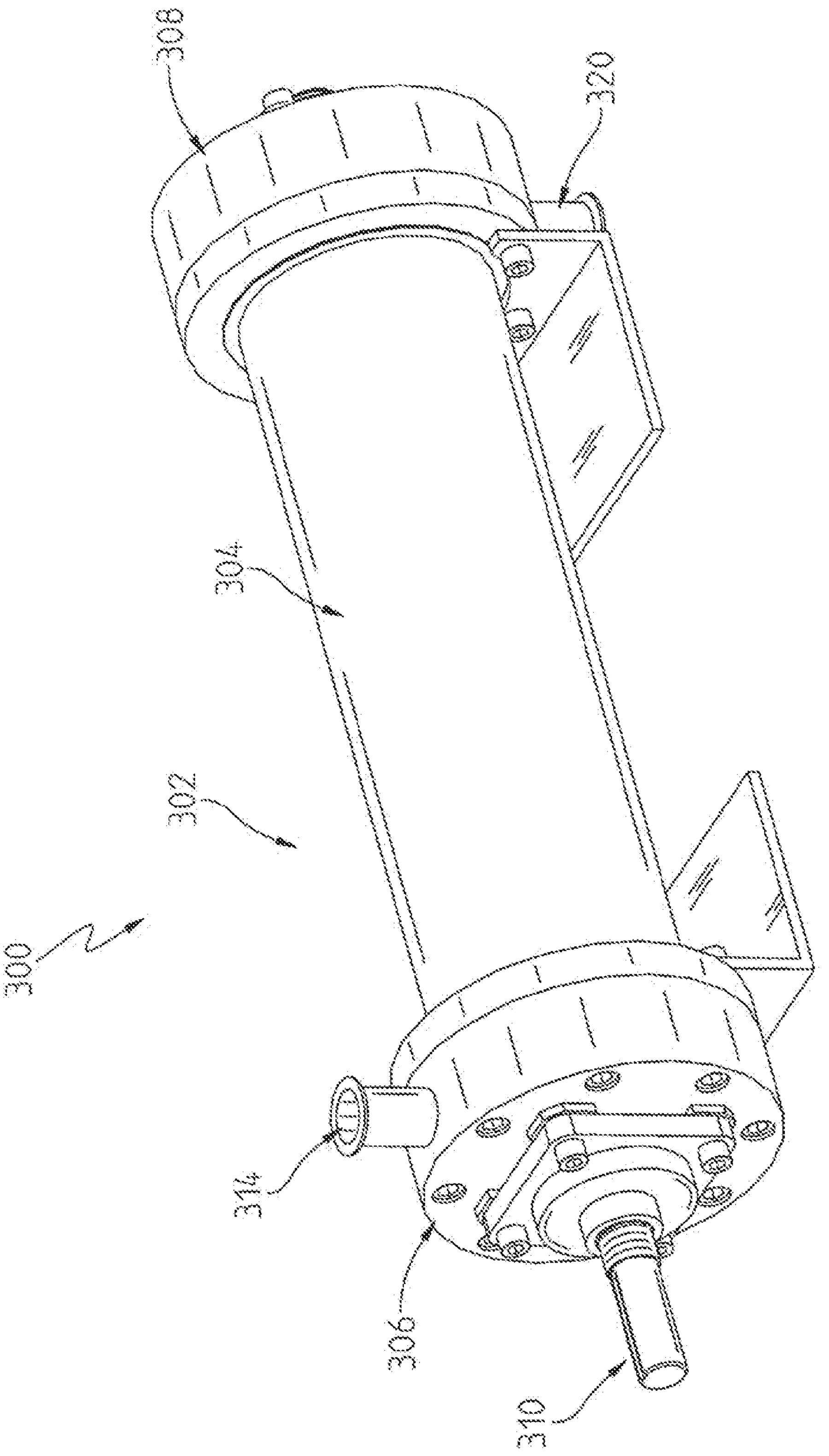
FIG. 5 is a perspective view of a gas dispersion apparatus.

Referring to FIGS. 4-12, an exemplary embodiment of a second phase dispersion apparatus 300 is shown. Referring to FIG. 4, second phase dispersion apparatus 300 includes a housing 302 including a cylindrical body member 304, a first end cap 306, and a second end cap 308. Second phase dispersion apparatus 300 further includes a rotatable shaft 310.

Figure 11:
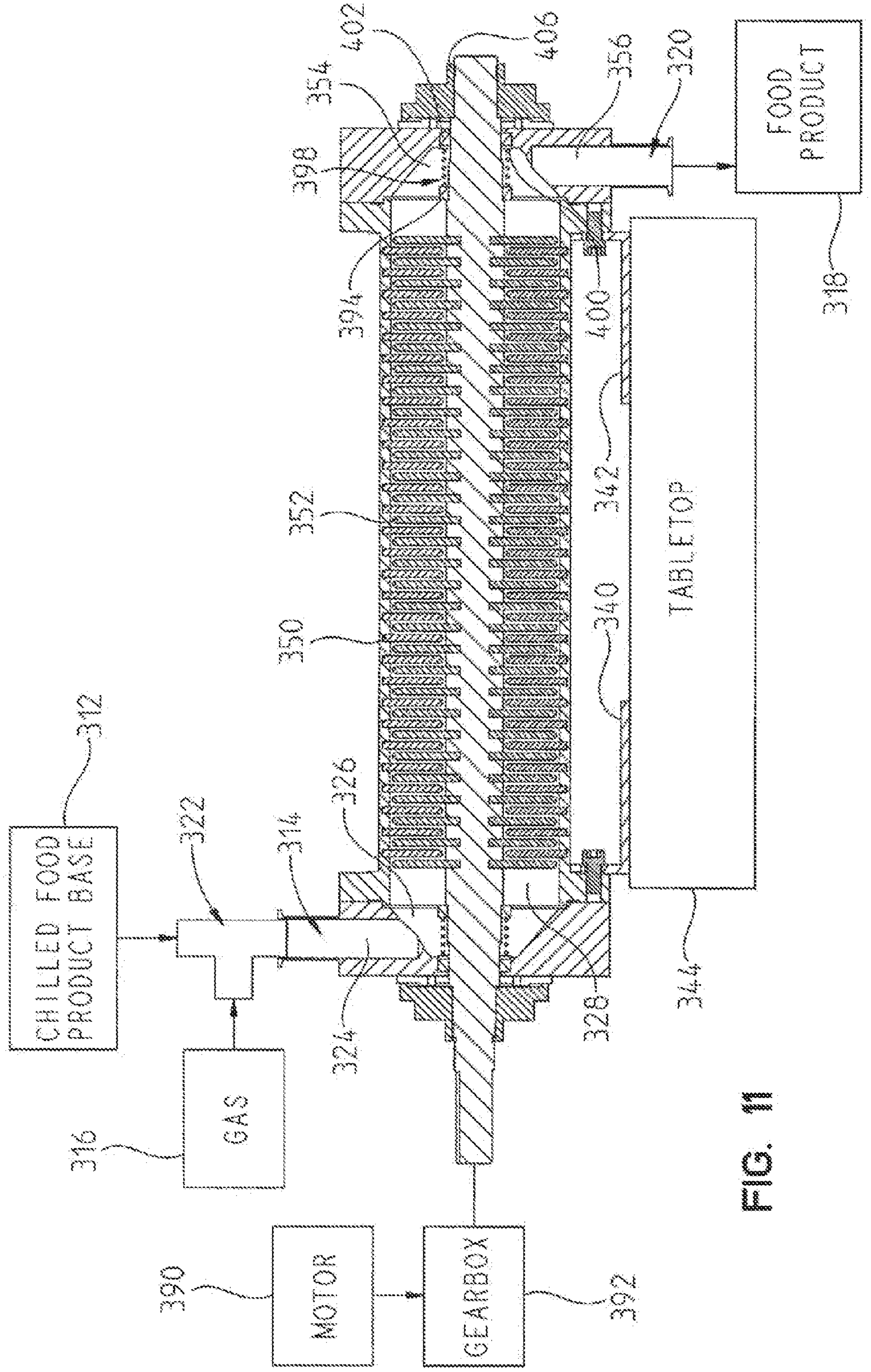
FIG. 11 is a sectional view of the gas dispersion apparatus of FIG. 6 through a centerline of the gas dispersion apparatus.
Figure 12:
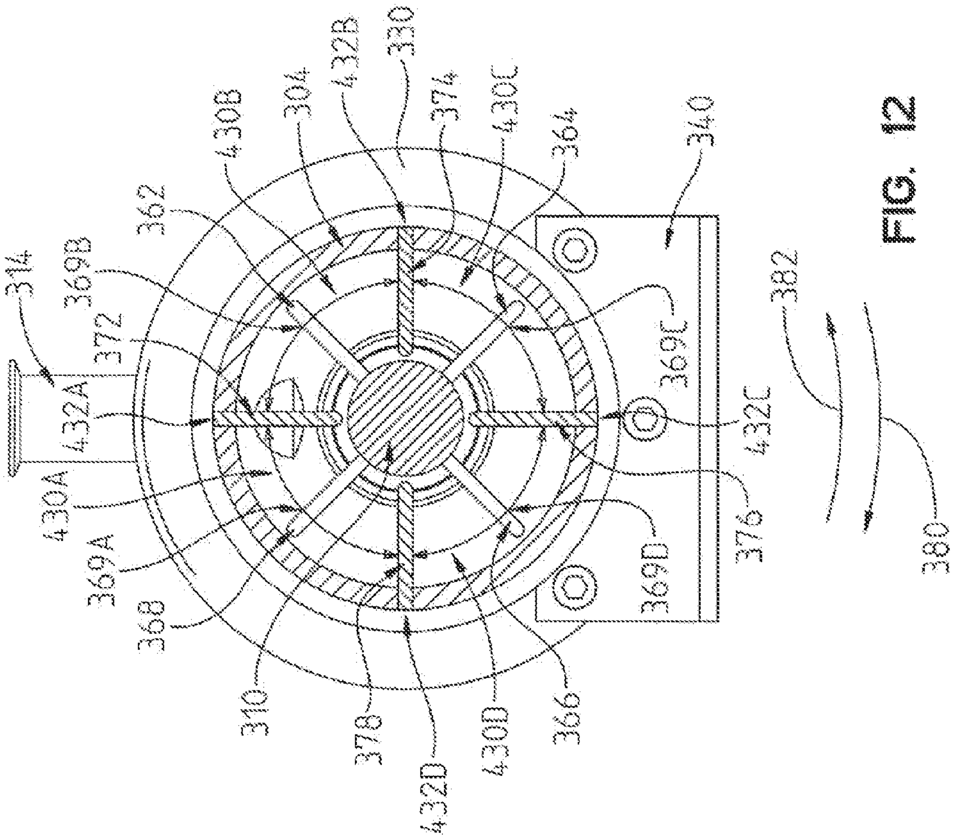
FIG. 12 is a section view of the gas dispersion apparatus of FIG. 6 along lines 12-12 in FIG. 11.

Referring to FIG. 11, a chilled food product base 312 is introduced into second phase dispersion apparatus 300 through an inlet 314 wherein it is combined with a gas 316 from a gas source to produce a food product 318 which exits second phase dispersion apparatus 300 through an outlet 320. Other suitable non-Newtonian fluid base portions and second phases may be used in second phase dispersion apparatus. Both chilled food product base 312 and gas 316 are introduced into a T-coupling 322 which is in fluid communication with a passageway 324 in first end cap 306. Passageway 324 is in fluid communication with recess 326 which as shown in FIG. 12 is in fluid communication with a cavity 328 of body member 304. In one embodiment, chilled food product base 312 and gas 316 are introduced into recess 326 through separate inlets.

Figure 6:
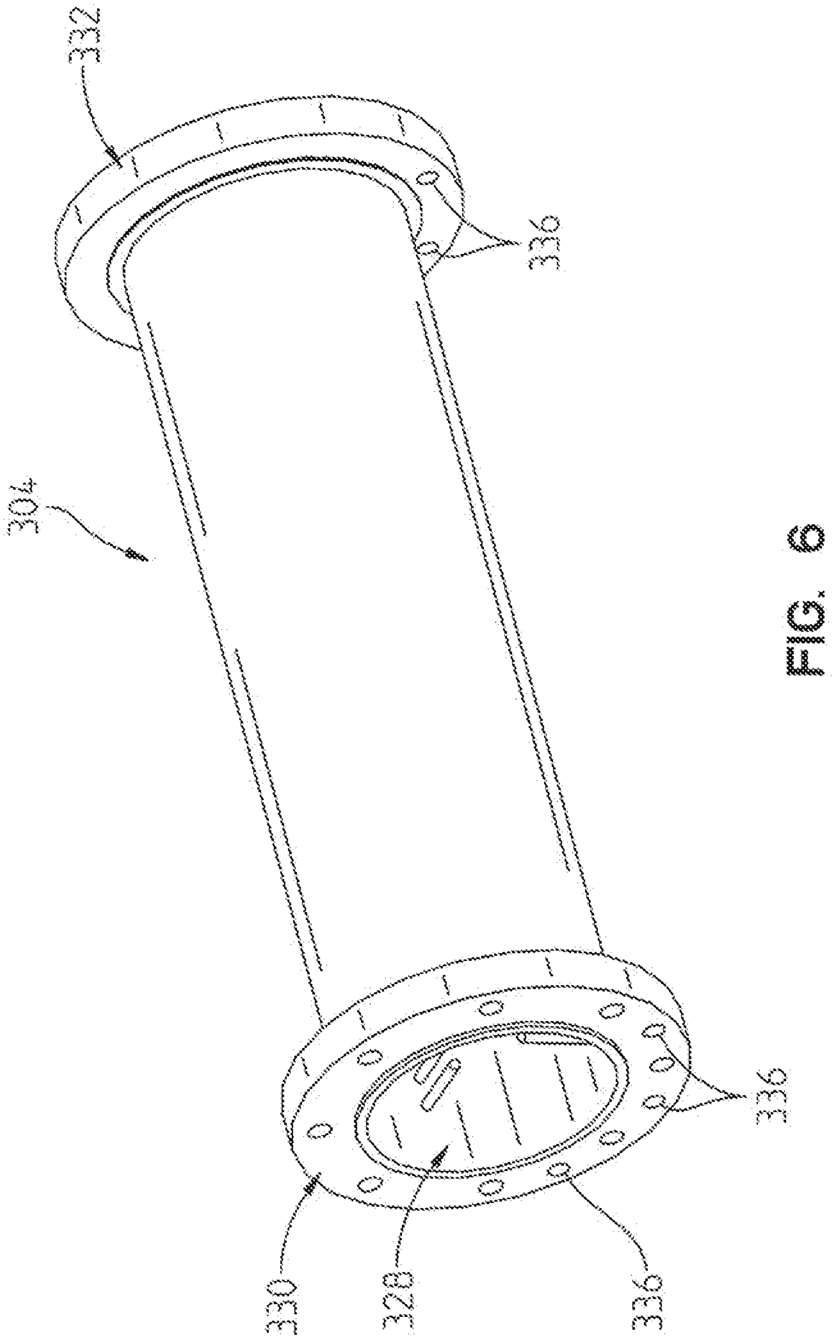
FIG. 6 is a perspective view of a body member of the gas dispersion apparatus of FIG. 5.

Referring to FIG. 6, body member 304 includes a first flange 330 to couple to first end cap 306 and a second flange 332 to couple to second end cap 308. In one embodiment, seals (not shown) are disposed between first end cap 306 and first flange 330 and between second flange 332 and second end cap 308. First end cap 306 is coupled to first flange 330 through a plurality of couplers 334, illustratively bolts. Second end cap 308 is coupled to second flange 332 through a plurality of couplers 334, illustratively bolts.

Flanges 330 and 332 each include a plurality of additional apertures 336 which receive couplers 338, illustratively bolts, to couple the respective flanges 330, 332 to support brackets 340 and 342. Support brackets 340 and 342 are coupled to a support 344. An exemplary support 344 is a tabletop.

Figure 11A:
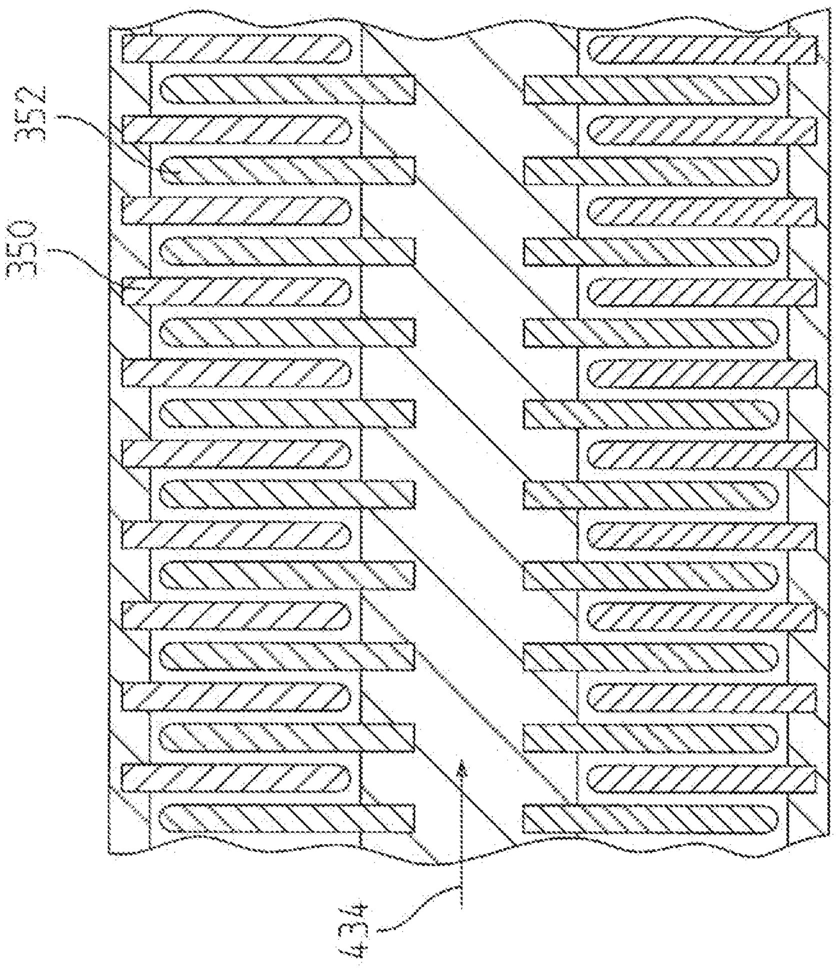
FIG. 11A is a detail view of a portion of FIG. 11.
Figure 11B:
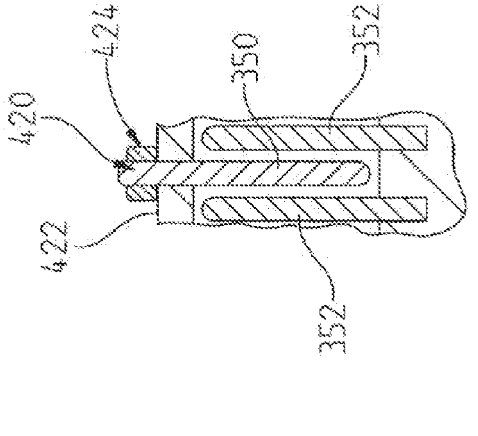
FIG. 11B is a detail view of a second method of coupling a pin to a body member of the gas dispersion apparatus of FIG. 11.

As the chilled food product base 312 and gas 316 advance through cavity 328, they encounter shear members, illustratively pins 350 coupled to body member 304 and pins 352 coupled to rotatable shaft 310. In FIG. 11A, pins 350 are received in recesses in body member 304 and are welded in place. Pins 352 are similarly coupled to rotatable shaft portion 360. Referring to FIG. 11B, in one embodiment pins 350 are elongated and include a threaded portion 420 that extends beyond an exterior surface 422 of body member 304. Pin 350 is secured to body member 304 with a nut 424 coupled to pin 350.

As explained herein pins 350 and 352 disperse gas 316 throughout chilled food product base 312 such that gas 316 is generally evenly dispersed as food product 318 exits second phase dispersion apparatus 300. Cavity 328 is in fluid communication with a recess 354 in second end cap 308 which is in turn in fluid communication with a passageway 356 in second end cap 308 which is apart of outlet 320. Second end cap 308 is generally identical to first end cap 306, except that it is rotated 180 degrees relative to body member 304.

Figure 7:
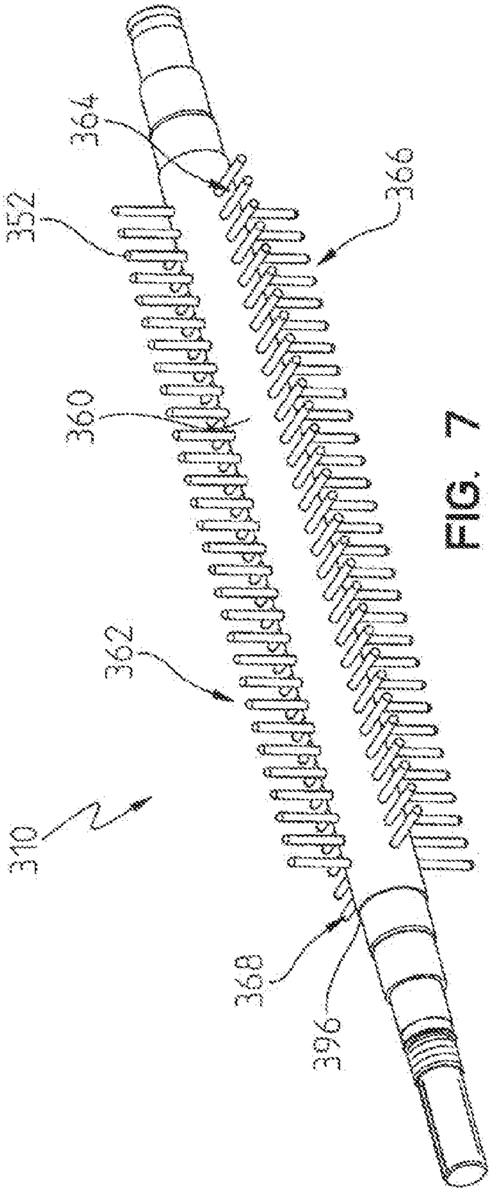
FIG. 7 is a perspective view of a rotatable member of the gas dispersion member of FIG. 5.
Figure 8:
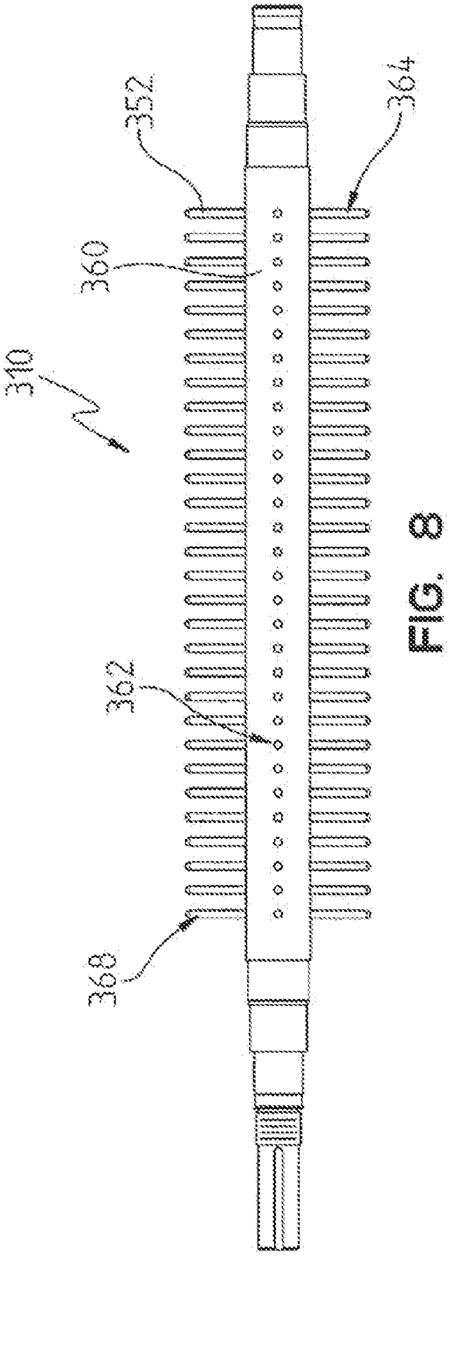
FIG. 8 is a side view of the rotatable member of FIG. 7.
Figure 10:
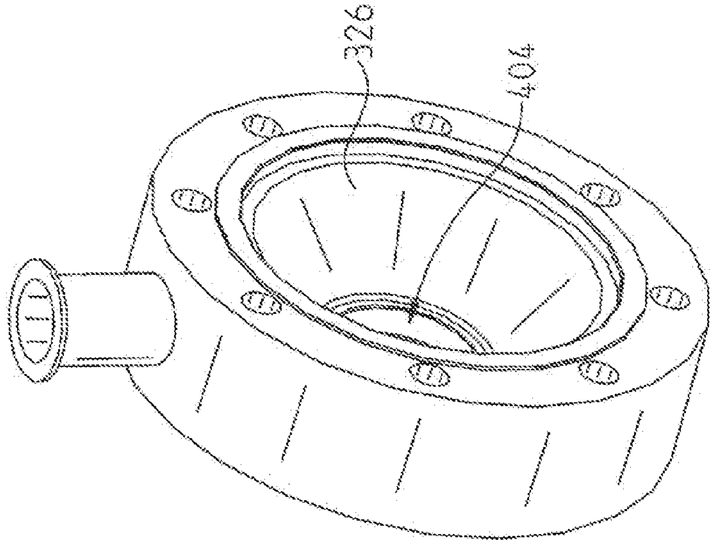
FIG. 10 is a second perspective view of an end cap of the gas dispersion apparatus of FIG. 6.
Figure 9:
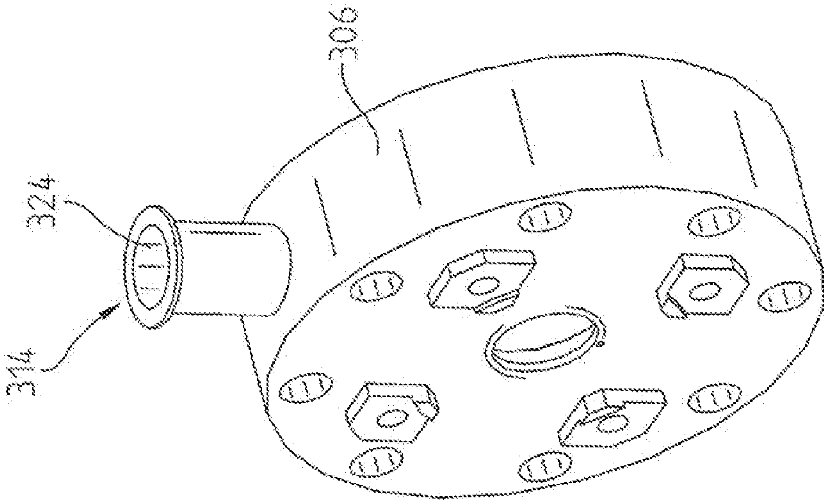
FIG. 9 is a first perspective view of an end cap of the gas dispersion apparatus of FIG. 6.

Referring to FIGS. 7 and 8, rotatable shaft 310 is illustrated. Rotatable shaft 310 includes a center portion 360 to which are coupled pins 352. Illustratively, pins 352 are arranged in four rows 362, 364, 366, and 368 each having a plurality of equally spaced pins. As shown in FIG. 11A, pins 352 are arranged so that they interleave with pins 350 coupled to body member 304. As shown in FIG. 12, pins 350 are also arranged if four rows 372, 374, 376, and 378 each having a plurality of equally spaced pins (see FIG. 11).

Referring to FIG. 12, rows 362, 364, 366, and 368 of pins 352 rotate in one of directions 380 and 382 as rotatable shaft 310 also rotates in one of direction 380 and 382. As generally illustrated in FIG. 11, rows 362, 364, 366, and 368 of pins 352 are generally in line with rows 372, 374, 376, and 378 of pins 350. As generally illustrated in FIG. 12, rows 362, 364, 366, and 368 of pins 352 are generally rotated 45 degrees in direction 380 with respect to rows 372, 374, 376, and 378 of pins 350 due to the rotation of rotatable shaft 310. Although four rows of pins are shown for both body member 304 and rotatable shaft 310, it is contemplated to have fewer, such as three or less, or more, such as five or more, rows of pins.

Referring to FIG. 11, rotatable shaft 310 is coupled to a motor 390 through a gearbox 392. In one embodiment, motor 390 drives rotatable 310 at a revolutions per minute ("rpm") of at least about 500 rpm.

Both ends of rotatable shaft are supported and located relative to housing 302 with a plurality of bearings and springs. Referring to the end of rotatable shaft 310 closest to outlet 320, a first bearing 394 is positioned on rotatable shaft 310 and is located by a stop surface 396 (see FIG. 7). A spring 398 is compressed between first bearing 394 and a base member 400. Base member 400 abuts against a second bearing 402 which is received in a recess 404 in second end cap 308. Second bearing 402 is a stationary bearing and includes a keyway that cooperates with a key of second end cap 308 to limit the rotation of second bearing 402 relative to second end cap 308. In one embodiment, the key is a pin and the keyway is a slot. A third bearing is supported by a bracket 406 which is bolted onto second end cap 308.

In one embodiment, pins 350 and 352 each are cylindrical and have a diameter of about 0.25 inches. The longitudinal axis of adjacent pins 350 in rows 372, 374, 376, and 378 are spaced apart about 0.75 inches. Further, the longitudinal axis of adjacent pins 352 in rows 362, 364, 366, and 368 are spaced apart about 0.75 inches. This spacing results in a spacing between a given pin 350 and an adjacent pin 352 of about 0.125 inches. In one embodiment, the spacing between a given pin 350 and an adjacent pin 352 is in the range of about 0.015 inches to about 0.188 inches may be implemented. In addition, a diameter of cavity 328 is about 5.875 inches, a diameter of the center portion of rotatable shaft 310 is about 2 inches, and pins 352 extend from rotatable shaft 310 a distance of about 1.8125 to about 1.875 inches resulting in a clearance from the inner surface of cavity 328 of about 0.125 inches to about 0.0625 inches. Pins 350 similarly provide a clearance from shaft 310 of about 0.125 inches to about 0.0625 inches. In one embodiment the clearance of pins 350 from shaft 310 and the clearance of pins 352 from the inner surface of cavity 328 is in the range of about 0.012 inches to about 0.188 inches. In one embodiment, a length of cavity 328 is about 24.625 inches. This gives a volume of cavity 328 of about 670 cubic inches not accounting for the volume of pins 350, pins 352, and rotatable shaft 310.

Referring to FIG. 12, second phase dispersion apparatus 300 includes a plurality of mixing zones 430A-D and a plurality of high shear zones 432A-D. In FIG. 11A, the non-Newtonian fluid base product and the second phase are generally moving in longitudinal direction 434. The non-Newtonian fluid base product and second phase are also being moved in either direction 380 and 382 as rotatable pins 352 are rotated in either direction 380 or 382. The non-Newtonian fluid base product and second phase are pushed along generally in direction 434 by additional non-Newtonian fluid base product and second phase entering second phase dispersion apparatus 300.

In high shear zones 432A-D, a rotating pin 352 rotates past a stationary pin 350 causing the non-Newtonian fluid base product to be broken or chopped up providing additional surface area of non-Newtonian fluid base product for the second phase to be adjacent to and become more uniformly dispersed. Assuming shaft 310 is rotating in direction 380, for high shear zone 432A as a respective pin of 368 rotates past two adjacent pins of row 372, the non-Newtonian fluid base product is sheared.

In mixing zones 430A-D, the non-Newtonian fluid base product is not broken or chopped due to the shear of the movement of pins 352 relative to pins 350, but is mixed with the second phase generally in respective regions 369A-D (see FIG. 12) due to the respective drag coefficient of the rotating pin 352 passing through the non-Newtonian fluid base product. In one embodiment, the drag coefficient is about 5 to about 100.

For each shear zone 432A-D, a plurality of regions are provided along a length of second phase dispersion apparatus 300 to shear the product passing thereby. Each region corresponds to the area that a given grouping of rotating pins 352 pass through adjacent groupings of stationary pins. In the illustrated embodiment having four rows of rotating pins 352, each region of high shear zone 432A shears portions of the non-Newtonian fluid base product four times for each revolution of shaft 310. As the non-Newtonian fluid base product continues to advance in direction 434 is further broken or chopped up by additional regions of each shear zone 432A-D. This process continues until the non-Newtonian fluid base product and the second phase are past pins 350 and 352.

In one embodiment, the number of rows of stationary pins 350 are in the range of 2 rows to 6 rows and the number of rotating pins 352 are in the range of 2 rows to 6 rows and any combinations thereof. The length of second phase dispersion apparatus 300 may be lengthened or shortened based on the number of rows of pins and the number of pins in each row in order to provide the same number of encounters with the high shear zones. In one embodiment, the non-Newtonian fluid base product has at least about 1000 encounters with regions of the high shear zones 432 (the material has at least about 1000 pin passes) per pound of product processed in the second phase dispersion apparatus 300. In one embodiment, the non-Newtonian fluid base product has in the range of about 1000 to about 5000 encounters with regions of the high shear zones 432 per pound of product processed in the second phase dispersion apparatus 300. In one embodiment, shaft 310 rotates at a speed of at least about 800 rpm. In one embodiment, the illustrated second phase dispersion apparatus 300 has the pins 352 rotating at about 20 to about 60 feet per second.

In one embodiment, a non-Newtonian fluid base portion is purchased and presented to second phase dispersion apparatus 300. As such, a second phase may be dispersed throughout a purchased non-Newtonian fluid base portion.

Although the invention has been described in detail with reference to certain preferred embodiments, variations and modifications exist within the spirit and scope of the invention as described and defined in the following claims.

The invention claimed is:

1. A second phase dispersion apparatus for dispersing a second phase within a non-Newtonian fluid base product to produce a non-Newtonian fluid product, the second phase dispersion apparatus being supported on a support, including:

a housing having a body, a first end cap coupled to the body, and a second end cap coupled to the body, the housing including at least one inlet through which the non-Newtonian fluid base product and the second phase are introduced, a cavity in the body wherein the non-Newtonian fluid base product and the second phase are mixed to generally evenly disperse the second phase in the non-Newtonian fluid base product, and an outlet through which the non-Newtonian fluid product is passed;

a support bracket coupled to the housing and supporting the housing relative to the support, the support bracket holding the housing stationary relative to the support;

a rotatable shaft positioned within the cavity, the rotatable shaft being rotatable relative to the body of the housing along a longitudinal axis of the housing, wherein the at least one inlet is provided in the first end cap and is generally perpendicular to the longitudinal axis of the housing and the outlet is provided in the second end cap and is generally perpendicular to the longitudinal axis of the housing;

a first plurality of pins protruding into the cavity, the first plurality of pins being fixed relative to the body and arranged in a plurality of rows along a longitudinal direction of body, the first plurality of pins being angled relative to the longitudinal axis of the rotatable shaft; and a second plurality of pins supported by the rotatable shaft and arranged to interleave between the first plurality of pins as the rotatable shaft is rotated about the longitudinal axis relative to the housing, the second plurality of pins being angled relative to the longitudinal axis.

2. The second phase dispersion apparatus of claim 1, wherein the non-Newtonian fluid base product is a chilled food base product and the second phase is nitrogen.

3. The second phase dispersion apparatus of claim 1, wherein the first plurality of pins are arranged in a plurality of rows extending along the longitudinal axis of the housing and the second plurality of pins are arranged in a plurality of rows which also extend along the longitudinal axis of the housing.

4. The second phase dispersion apparatus of claim 3, wherein when a first row of the first plurality of rows is aligned with a second row of the second plurality of rows a clearance between adjacent pins of the first row and the second row is about 0.125 inches.

5. The second phase dispersion apparatus of claim 3, wherein when a first row of the first plurality of rows is aligned with a second row of the second plurality of rows a clearance between adjacent pins of the first row and the second row is between about 0.015 inches to about 0.188 inches.

6. The second phase dispersion apparatus of claim 5, wherein the pins of the first plurality of pins extend towards the rotatable shaft and have a clearance from the rotatable shaft of between about 0.012 inches to about 0.188 inches and the pins of the second plurality of pins extend towards an interior surface of the cavity in the body and have a clearance from the interior surface of between about 0.012 inches to about 0.188 inches.

7. The second phase dispersion apparatus of claim 1, wherein the first end cap is removably coupled to the housing, the first end cap including a recess in fluid communication with the cavity of the housing and a passageway, the passageway being in fluid communication with the recess, wherein the non-Newtonian fluid base product passes through the passageway.

8. The second phase dispersion apparatus of claim 7, wherein the second end cap is removably coupled to the housing, the second end cap including a recess in fluid communication with the cavity of the housing and a passageway, the passageway of the second end cap being in fluid communication with the recess of the second end cap, wherein the non-Newtonian fluid product is passed through the passageway of the second end cap.

9. The second phase dispersion apparatus of claim 8, wherein the non-Newtonian fluid base product is a chilled food base product and the second phase is nitrogen.

10. The second phase dispersion apparatus of claim 8, wherein the first plurality of pins are arranged in a plurality of rows extending along the longitudinal axis of the housing and the second plurality of pins are arranged in a plurality of rows which also extend along the longitudinal axis of the housing, wherein when a first row of the first plurality of rows is aligned with a second row of the second plurality of rows a clearance between adjacent pins of the first row and the second row is about 0.125 inches.

11. The second phase dispersion apparatus of claim 8, wherein the first plurality of pins are arranged in a plurality of rows extending along the longitudinal axis of the housing and the second plurality of pins are arranged in a plurality of rows which also extend along the longitudinal axis of the housing, wherein when a first row of the first plurality of rows is aligned with a second row of the second plurality of rows a clearance between adjacent pins of the first row and the second row is between about 0.015 inches to about 0.188 inches.

12. The second phase dispersion apparatus of claim 11, wherein the pins of the first plurality of pins extend towards the rotatable shaft and have a clearance from the rotatable shaft of between about 0.012 inches to about 0.188 inches and the pins of the second plurality of pins extend towards an interior surface of the cavity in the body and have a clearance from the interior surface of between about 0.012 inches to about 0.188 inches.

13. The second phase dispersion apparatus of claim 1, wherein the first end cap is removably coupled to the housing, the first end cap including a recess in fluid communication with the cavity of the housing and a passageway, the passageway being in fluid communication with the recess, wherein the non-Newtonian fluid base product and the second phase pass through the passageway.

14. The second phase dispersion apparatus of claim 13, wherein the second end cap is removably coupled to the housing, the second end cap including a recess in fluid communication with the cavity of the housing and a passageway, the passageway of the second end cap being in fluid communication with the recess of the second end cap, wherein the non-Newtonian fluid product is passed through the passageway of the second end cap.

15. The second phase dispersion apparatus of claim 14, wherein the non-Newtonian fluid base product is a chilled food base product and the second phase is nitrogen.

16. The second phase dispersion apparatus of claim 15, wherein the first plurality of pins are arranged in a plurality of rows extending along the longitudinal axis of the housing and the second plurality of pins are arranged in a plurality of rows which also extend along the longitudinal axis of the housing, wherein when a first row of the first plurality of rows is aligned with a second row of the second plurality of rows a clearance between adjacent pins of the first row and the second row is about 0.125 inches.

17. The second phase dispersion apparatus of claim 15, wherein the first plurality of pins are arranged in a plurality of rows extending along the longitudinal axis of the housing and the second plurality of pins are arranged in a plurality of rows which also extend along the longitudinal axis of the housing, wherein when a first row of the first plurality of rows is aligned with a second row of the second plurality of rows a clearance between adjacent pins of the first row and the second row is between about 0.015 inches to about 0.188 inches.

18. The second phase dispersion apparatus of claim 17, wherein the pins of the first plurality of pins extend towards the rotatable shaft and have a clearance from the rotatable shaft of between about 0.012 inches to about 0.188 inches and the pins of the second plurality of pins extend towards an interior surface of the cavity in the body and have a clearance from the interior surface of between about 0.012 inches to about 0.188 inches.

* * * * *